(12) United States Patent
Park et al.

(10) Patent No.: US 9,766,875 B2
(45) Date of Patent: Sep. 19, 2017

(54) MULTIMEDIA DATA PROCESSING METHOD IN GENERAL PURPOSE PROGRAMMABLE COMPUTING DEVICE AND DATA PROCESSING SYSTEM ACCORDING TO THE MULTIMEDIA DATA PROCESSING METHOD

(71) Applicant: SAMSUNG ELECTRONICS CO., LTD., Suwon-si, Gyeonggi-do (KR)

(72) Inventors: Yongha Park, Seongnam-si (KR); Hyunsuk Kim, Seoul (KR); Jinaeon Lee, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 248 days.

(21) Appl. No.: 14/470,172

(22) Filed: Aug. 27, 2014

(65) Prior Publication Data

US 2015/0070363 A1 Mar. 12, 2015

(30) Foreign Application Priority Data

Sep. 6, 2013 (KR) ........................ 10-2013-0107453

(51) Int. Cl.
*G06T 1/20* (2006.01)
*G06F 9/445* (2006.01)

(52) U.S. Cl.
CPC .................. *G06F 8/65* (2013.01); *G06T 1/20* (2013.01); *Y02B 60/183* (2013.01)

(58) Field of Classification Search
CPC ....................................................... G06T 1/20
USPC .................................................. 345/501, 503
See application file for complete search history.

(56) References Cited

U.S. PATENT DOCUMENTS

| 7,015,913 B1 | 3/2006 | Lindholm et al. |
| 7,418,576 B1 | 8/2008 | Lindholm et al. |
| 8,069,446 B2 | 11/2011 | Zhao et al. |
| 8,281,297 B2 | 10/2012 | Dasu et al. |
| 8,286,198 B2 | 10/2012 | Munshi et al. |
| 8,345,053 B2 | 1/2013 | Jiao et al. |
| 2011/0202745 A1* | 8/2011 | Bordawekar ............ G06T 1/20 712/30 |
| 2011/0242115 A1* | 10/2011 | Tsao ........................ H04N 5/232 345/522 |
| 2011/0316863 A1* | 12/2011 | Nishimaki ............. G06F 15/17 345/505 |
| 2012/0254591 A1 | 10/2012 | Hughes et al. |
| 2012/0256922 A1 | 10/2012 | Moy |

(Continued)

FOREIGN PATENT DOCUMENTS

KR 1020120083000 7/2012

*Primary Examiner* — Jacinta M Crawford
(74) *Attorney, Agent, or Firm* — F. Chau & Associates, LLC

(57) ABSTRACT

A method of processing multimedia data includes: separating a defined application kernel into a data patch kernel and a data processing kernel; requesting, by the data processing kernel, access to patch data of the multimedia data, from the data patch kernel; performing, by the data patch kernel, an operation that is independent of the request and preparing data for the data access based on the request; and performing, by the data processing kernel, an arithmetic operation on work items of the prepared data when the data has been prepared by the data patch kernel.

20 Claims, 11 Drawing Sheets

(56) References Cited

U.S. PATENT DOCUMENTS

2013/0054899 A1 2/2013 Ginzburg et al.
2014/0052965 A1* 2/2014 Sarel .................. G06F 1/329
                                                         712/214

* cited by examiner

Fig. 8

```
DataPatch
{
  Config data patch (W,H,w,h,P);
  D = patch access (i,j,ID);
  do {
    output = DataProcessing (D);
    D = patch sweep (di,dj,ID);
    store output;
  } while (end_of_workitem);
}
```
⎫ 110a

```
API to be hardwired
  - breakdown request into primitive access
  - multiple access to memory subsystem
  - collect all requested data
  - enforce boundary condition from property
  - pre-fetch and optimization for sweep
  - format conversion for processing
  - masking
```
⎫ 120a

```
DataProcessing
(structure DataPatch)
{
  ...
  Calculation,
  Calculation,
  Calculation
  ...
  Return Results
}
```
⎫ 130a

MULTIMEDIA DATA PROCESSING METHOD IN GENERAL PURPOSE PROGRAMMABLE COMPUTING DEVICE AND DATA PROCESSING SYSTEM ACCORDING TO THE MULTIMEDIA DATA PROCESSING METHOD

CROSS-REFERENCE TO RELATED APPLICATIONS

This U.S. non-provisional patent application claims priority under 35 U.S.C. §119 to Korean Patent Application No. 10-2013-0107453, filed on Sep. 6, 2013, the disclosure of which is incorporated by reference herein.

BACKGROUND

Technical Field

The present inventive concept herein relates to multimedia data processing, and more particularly, to a multimedia data processing method in a general purpose programmable computing device and a data processing system according to the multimedia data processing method.

Discussion of Related Art

A data processing system has at least one processor known as a central processing unit (CPU). The data processing system may have other processors that are used for various types of specialized processing, for example, a graphic processing unit (GPU).

A GPU is designed to execute graphic processing operations. The CPU may function as a host or a control processor, and handoff specialized functions such as a graphic processing to the GPU.

A hybrid core having characteristics of both the CPU and GPU may be used in a general purpose GPU (GPGPU) computing style. The GPCPU computing style has the CPU execute most functions, but supports offloading functions where performance is important to the GPU.

A coprocessor including the CPU and the GPU may access a supplemental memory, for example, a graphic memory when performing processing tasks. The coprocessor may be optimized to perform a 3D graphic operation to support applications such as a game and a computer aided design (CAD).

Using GPGPU computing may be effective on graphics data. However, when processing multimedia data, since multimedia data has different characteristics from graphic data, it may be inefficient to process such data using GPGPU computing.

SUMMARY

An exemplary embodiment of the inventive concept provides a multimedia data processing method in a general purpose programmable computing device. The multimedia data processing method in a general purpose programmable computing device includes: dividing a defined application kernel into a data patch kernel and a data processing kernel between which a request of a handshaking method is applied; independently performing a data patch processing that makes a memory access locality guaranteed at a higher rank than work items through the data patch kernel; and performing an arithmetic operation on data through the data processing kernel when the data has been prepared by the data patch processing of the data patch kernel work item by work item.

An exemplary embodiment of the inventive concept provides a multimedia data processing method in a general purpose graphic processing unit. The multimedia data processing method in a general purpose graphic processing unit includes: dividing an application kernel performing multimedia data into a data patch kernel and a data processing kernel between which a request of a handshaking method is applied; independently performing a data patch processing beyond the boundary of work items through the data patch kernel to increase a data reuse rate; and intensively performing an arithmetic operation on data through the data processing kernel when the data is completely prepared by the data patch processing of the data patch kernel work item by work item.

An exemplary embodiment of the inventive concept provides a data processing system. The data processing system includes: a patch unit independently performing a data patch processing that makes a memory access locality guaranteed at a higher rank than work items, the patch unit being constituted in a graphic processing unit; a processing unit performing an arithmetic operation on data according to a request of a handshaking method of the patch unit when the data has been prepared by the data patch processing item by work item, the processing unit being constituted in a graphic processing unit; and a memory device being accessed by the patch unit and the processing unit through a bus.

An exemplary embodiment of the inventive concept provides a data processing system. The data processing system includes: a central processing unit; a general purpose graphic processing unit comprising an application kernel including a data patch kernel independently performing a data patch processing beyond the boundary of work items to increase a data reuse rate and a data processing kernel intensively performing an arithmetic operation on data according to a request of a handshaking method of the data patch kernel when data is all completely prepared by the data patch processing of the data patch kernel work item by work item; and a memory device being accessed by the central processing unit and the general purpose graphic processing unit.

An exemplary embodiment of the inventive concept provides a method of processing multimedia data that includes: separating a defined application kernel into a data patch kernel and a data processing kernel; requesting, by the data processing kernel, access to patch data of the multimedia data, from the data patch kernel; performing, by the data patch kernel, an operation that is independent of the request and preparing data for the data access based on the request; and performing, by the data processing kernel, an arithmetic operation on work items of the prepared data when the data has prepared by the data patch kernel.

An exemplary embodiment of the inventive concept provides a method of processing multimedia data that includes: separating an application kernel operating on the multimedia data into a data patch kernel and a data processing kernel that communicate with one another using a handshaking method; requesting, by the data processing kernel, preparation of first data of the multimedia data for a task, by the data patch kernel; preparing, by the data patch kernel, the first data and second other data for another task; and continuously performing, by the data processing kernel, an arithmetic operation on work items of the prepared first data when the first data has been completely prepared.

An exemplary embodiment of the inventive concept provides a data processing system that includes: a central processing unit; a general purpose graphic processing unit comprising an application kernel including a data patch kernel preparing first data based on a request and second other data independent of the request and a data processing kernel continuously performing an operation on work items of the first data according to the request of a handshaking method to the data patch kernel when the first data has all completely been prepared; and a memory device configured to be accessed by the central processing unit and the general purpose graphic processing unit.

An exemplary embodiment of the inventive concept provides a method of processing multimedia data that includes: sending, by a first part of a kernel of an operating system (OS), a request message to a second other part of the kernel, the request message requesting that the second part prepare data of the multimedia data for a first task; performing an operation, by the first part, on second work items of a second other task until receiving an acknowledge message from the second part indicating the data has been prepared; and performing an operation, by the first part, on first work items of the first task using the prepared data after receiving the acknowledge message.

BRIEF DESCRIPTION OF THE FIGURES

The drawings illustrate exemplary embodiments of the inventive concept. In the drawings:

FIG. 8 is a drawing illustrating an example of a computer kernel source that can be executed by FIG. 4;

DETAILED DESCRIPTION

Figure 1:
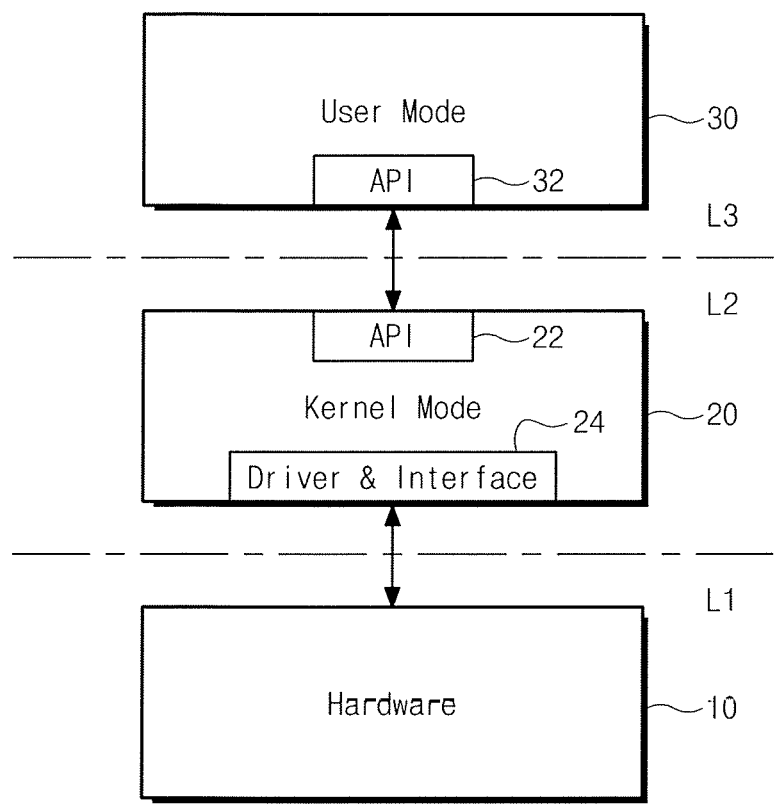
FIG. 1 is a schematic view illustrating a computing structure.

Exemplary embodiments of inventive concept will be described below in more detail with reference to the accompanying drawings, in which embodiments of the invention are shown. This inventive concept may, however, be embodied in many different forms and should not be construed as limited to the embodiments set forth herein. In the drawings, the size and relative sizes of layers and regions may be exaggerated for clarity. Like numbers refer to like elements throughout.

FIG. 1 is a schematic view illustrating a computing structure. Referring to FIG. 1, the computer structure has multiple layers. The computer structure includes a hardware layer, an operating system (OS) layer and an application layer from the bottom. These layers may correspond to a hardware layer L1, a kernel mode layer L2 and a user mode layer L3 as illustrated in FIG. 1.

The uppermost part of the computer structure is a user mode layer 30. The user mode layer 30 may include applications. The applications communicate with a set of API 32.

Typically, since the API set is considered as a part of an operating system, it is a part of a computing platform.

In the computer structure, a kernel mode layer 20 is present under the user mode layer 30. The kernel mode layer 20 may be referred to as a "kernel" of an operating system. Since the kernel mode layer 20 is a part of the operating system, it is a part of the computing platform. The kernel of the operating system is a privileged part (e.g., may be the most reliable part in the operating system). The kernel of the operating system is an internal layer of a code. The kernel of the operating system can operate an input/output, security, a display control part, a memory management part and privileged functions. The kernel accesses hardware 10 of the hardware layer L1 through a device driver and a hardware interface 24.

Kernel APIs 22 are APIs controlling access to kernel functions. The applications do not directly call (e.g., invoke) the kernel. The applications instead call the API 32, and then the API 32 can call the kernel API 22.

The hardware layer L1 is present under the kernel mode layer 20. The hardware layer L1 includes all hardware of a real computer. The hardware layer L1 includes processors, a memory, a disk input/output, other input/outputs, etc.

Thus, the computer structure includes a hardware layer 10, a kernel layer 20 and a user mode layer 30 including API 32.

A main function of the operating system is to manage resources of a computer system. Examples of the resources include a processor, a storage device (a memory, a hard disk, etc.), an input/output device (a printer, a monitor display, etc.) and a communication device (a modem, a network interface, etc.). The kernel of the operating system is a core component of the operating system. Examples of functions of the kernel include a process management, a communication between processors, an interrupt process, a storage assignment/return support, an input/output activity support, a system security method, etc.

Performing an independent program work item by work item unit in a GPU may be effective on graphics data such as a Vertex and a Fragment. For example, a Vertex may be graphics primitive operated on by a vertex shader of a GPU, and include traits such a position, texture coordinates, colors, etc. For example, a geometry shader of a GPU can operate on an arrangement of Vertices (e.g., arranged as triangle) to output one or more graphic primitives that are rasterized where parts (e.g., Fragments) of the result are passed to a pixel shader of the GPU.

However, when processing multimedia data in GPGPU computing, performing an independent program work item unit by work item unit may be inefficient. This is because, since multimedia data has a different characteristic from graphic data, an arithmetic unit in a GPU additionally has to perform the work of calculating an address to access data needed in an arithmetic operation besides the arithmetic operation. For example, the independent program may be a software thread including several different tasks, where each task operates on a different series of data items (e.g., work items), where performing the program work item unit by work item unit means that a given task operates on all its data items before another task operates on its data items.

An arithmetic unit calculates a high level address to be used in a load/store operation operating on a data patch, and then transmits the calculated high level address to a load/store unit as an argument in an instruction. In an exemplary embodiment, a pre-defined related number of the Vertices are referred to as a patch or a data patch. The load/store unit converts the received high level address into a corresponding low level address, and then accesses a memory. Therefore, besides an arithmetic operation, the arithmetic unit of the GPU has to additionally perform a process of calculating an address needed to access data needed for an arithmetic operation. Thus, the calculation of the high level address of the arithmetic unit causes inefficiency and performance degradation of an arithmetic operation. Since an individual memory access occurs for each work item to guarantee parallelism, optimization can be difficult.

Figure 2:
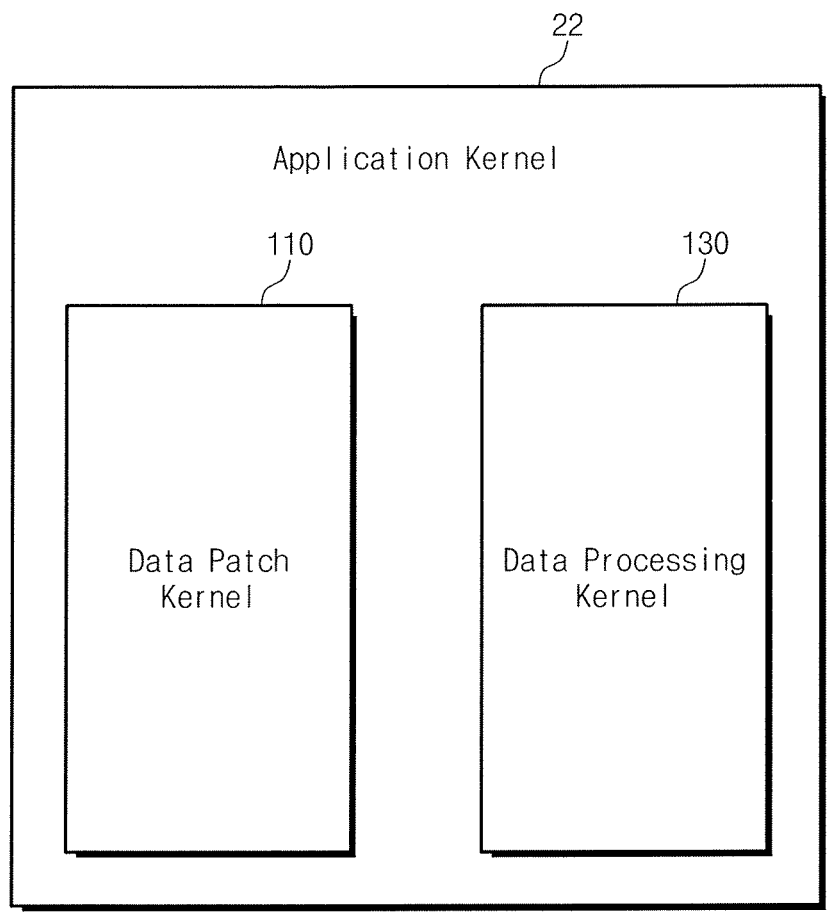
FIG. 2 is a constructional block diagram of an application kernel in accordance with an exemplary embodiment of the inventive concept.

To improve inefficiency and performance degradation of an arithmetic operation, in an exemplary embodiment of the inventive concept, the application kernel 22 is divided into a data patch kernel 110 and a data processing kernel 130 as shown in FIG. 2. FIG. 2 is a constructional block diagram of application kernel in accordance with an exemplary embodiment of the inventive concept.

A processing of multimedia data is performed by an application kernel for a work item. The application kernel sequentially performs a preprocessing for a memory access, a memory access and a post processing, and a data processing. Instructions being used to actually process data in those processing occupy a very small part of all the instructions. That is, most of the instructions are needed to calculate the high level address.

If the application kernel 22 is divided into the data patch kernel 110 and the data processing kernel 130, and then the data patch kernel 110 and the data processing kernel 130 are independently operated like FIG. 2, performance and efficiency of a data patch unit for a data access and a data processing unit for an arithmetic function may be improved.

Figure 3:
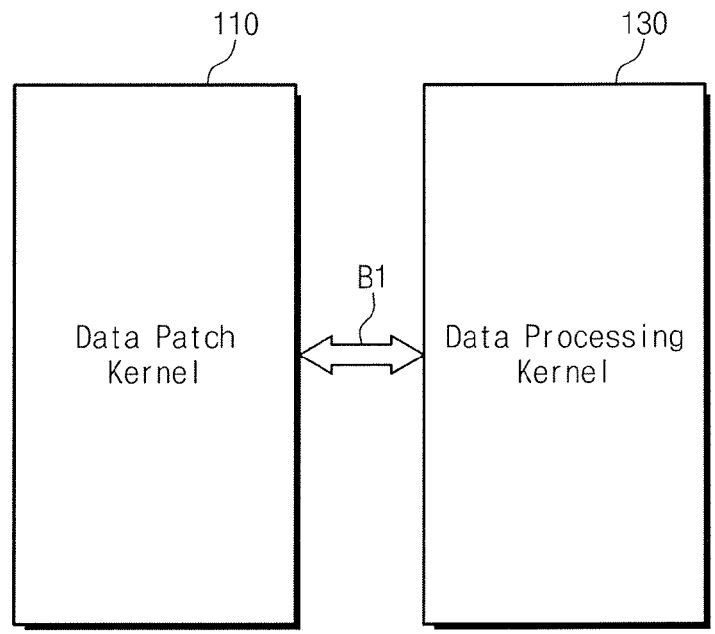
FIG. 3 is a kernel management constructional block diagram in accordance with an exemplary embodiment of FIG. 2.

FIG. 3 is a kernel management constructional block diagram in accordance with an exemplary embodiment of FIG. 2.

Referring to FIG. 3, the data patch kernel 110 and the data processing kernel 130 are included in the application kernel 22 of FIG. 2 but are separately operated. For example, each of the data patch kernel 110 and the data processing kernel 130 can operate independently from one another.

The data patch kernel 110 performs a data patch processing that makes a memory access locality guaranteed at a higher rank than work items. That is, the data patch kernel 110 independently performs a data patch processing beyond the boundary of work items to increase a data reuse rate. For example, if a first task needs to operate on first patch data comprising first work items and the data processing kernel 130 has requested access to the first patch data, performing a data patch processing beyond the boundary could refer to the data patch kernel 110 preparing second work items for a second other task.

When data has been prepared by a data patch processing of the data patch kernel 110 work item by work item, the data processing kernel 130 performs an arithmetic operation on the data. That is, when data has been completely prepared by a data patch processing of the data patch kernel 100 work item by work item, the data processing kernel 130 continuously performs an arithmetic operation on the data. For example, when the data processing kernel 130 is continuously performing the arithmetic operation, it processes all work items needed for a given task without processing an intervening work item needed for another task.

Before data has been completely prepared work item by work item, the data processing kernel 130 can process other tasks of a same thread or tasks of other threads.

The data patch kernel 110 and the data processing kernel 130 may communicate with one another using a hand shaking method. For example, the data patch kernel 110 and the data processing kernel 130 may send requests and acknowledges to one another during the hand shaking method. A channel B (e.g., B1) has been prepared between the data patch kernel 110 and the data processing kernel 130 for sending the requests, the acknowledges, and any other data that is required for the hand shaking.

As an example, the work items may be image pixel data or red, green, blue (R,G,B) pixel data.

According to FIG. 3, when the data patch kernel 110 and the data processing kernel 130 are independently operated, performance and efficiency of a GPU may be improved.

Figure 4:
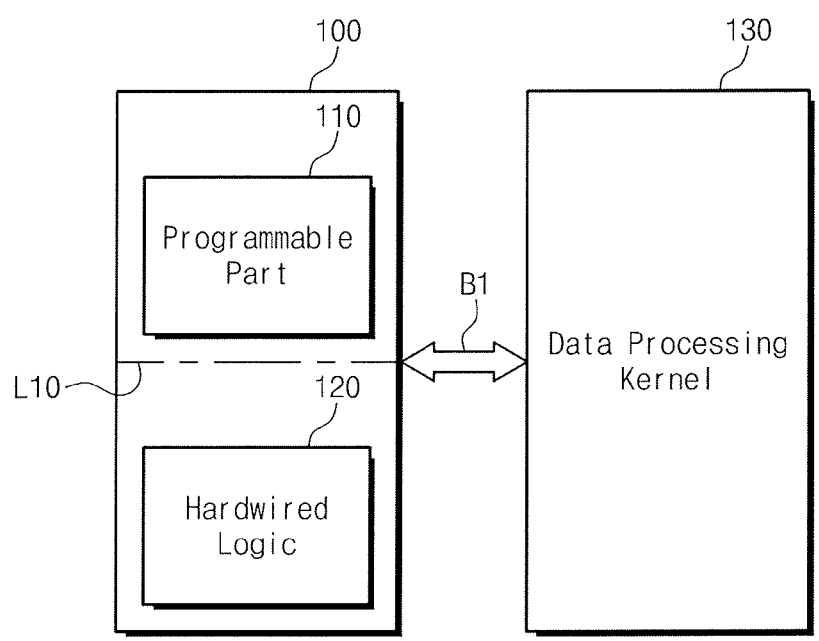
FIG. 4 is a kernel management constructional block diagram in accordance with an exemplary embodiment of FIG. 2.

FIG. 4 is a kernel management constructional block diagram in accordance with an exemplary embodiment of FIG. 2.

Referring to FIG. 4, an application kernel (e.g., 22) includes a data patch kernel block 100 and a data processing kernel 130.

The data patch kernel block 100 includes a programmable part 110 corresponding to the data patch kernel of FIG. 3 and hardwired logic 120.

The programmable part 110 corresponding to the data patch kernel can define an application program interface API to accelerate a processing using hardware support. The data processing kernel 130 can variably perform a unit multi-threading to increase energy efficiency on an arithmetic operation. For example, the data processing kernel 130 can use a variable number of threads to perform the operation. A request from the handshaking method can be applied between the data patch kernel block 100 and the data processing kernel 130. For example, a channel B1 has been prepared between the data patch kernel 100 and the data processing kernel 130 to enable the request to be applied.

In FIG. 4, a line L10 means a boundary line that distinguishes between the hardware layer L1 and the kernel mode layer L2 of FIG. 1.

The programmable part 110 corresponding to the data patch kernel performs a high level address calculation and a low level address calculation on data to be accessed for a data load and a store operation.

The data patch kernel 110 is programmed to support hardwired logic needed for a data patch. The data patch kernel 110 can program a new instruction set architecture ISA for a data patch.

In FIG. 4, the data processing kernel 130 can process tasks of other threads before receiving an acknowledge notifying of an access completion from the data patch kernel 110 through the channel B1 after requesting a data access to the data patch kernel 110.

The data processing kernel 130 can perform a dynamic threading control to increase energy efficiency with respect to the arithmetic operation.

Figure 5:
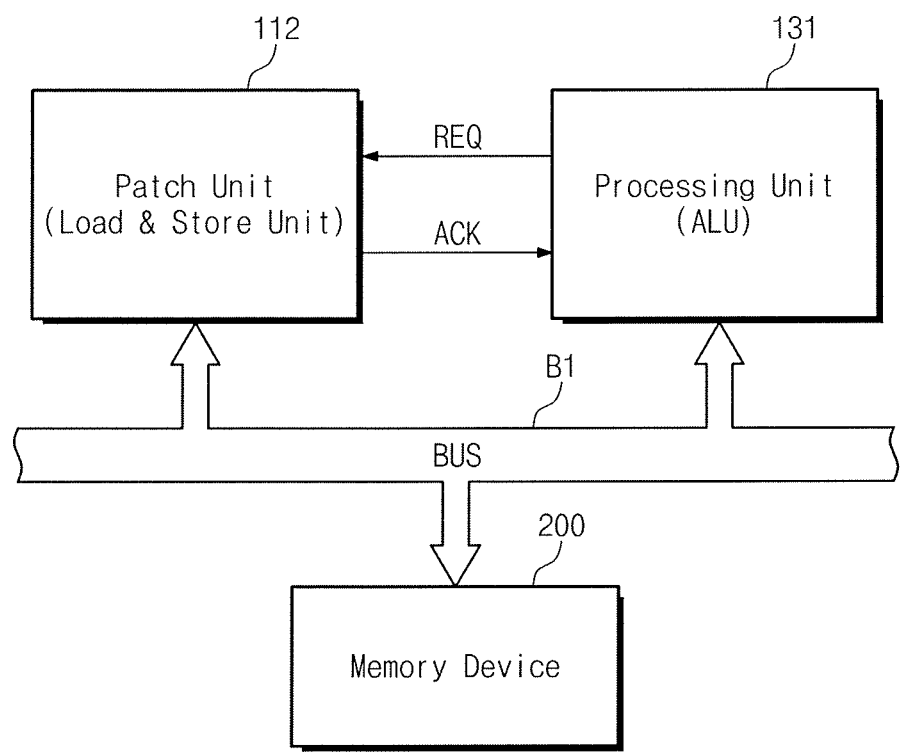
FIG. 5 is a constructional block diagram of a processing system in accordance with an exemplary embodiment of the inventive concept.

FIG. 5 is a constructional block diagram of a processing system in accordance with an exemplary embodiment of the inventive concept.

Referring to FIG. 5, the data processing system includes a patch unit 112, a processing unit 131 and a memory device 200. In an exemplary embodiment, the patch unit 112 is part of the data patch kernel 110 and the patch processing unit 131 is part of the data processing kernel 130.

The patch unit 112 independently performs a data patch processing that makes a memory access locality guaranteed at a higher rank than work items. The patch unit 112 may be implemented in software or hardware in the graphic processing unit GPU. For example, when the patch unit 112 is implemented in software, it can correspond to the data patch kernel. For example, when the patch unit 112 is implemented in hardware, it can be embodied in a load unit and a store unit.

When data has been prepared by the data patch processing work item by work item, the processing unit 131 performs an arithmetic operation on the data. The processing unit 131 can be implemented in software or hardware in the GPU. For example, when the processing unit 131 is implemented in software, it can correspond to the data processing kernel 130. For example, when the processing unit 131 is implemented in hardware, it can be embodied in an arithmetic logic unit (ALU).

The memory device 200 is accessed by the patch unit 112 and the processing unit 131 through a bus B1. In an exemplary embodiment, the patch unit 112 and the processing unit 131 communicate requests and acknowledges between one another using the bus B1 or a separate channel.

The memory device 200 can be embodied by a video RAM (VRAM). However, the memory device 200 is not limited to this example. The memory device 200 may be embodied by a part of a main memory, or a general memory or a solid state drive (SSD).

Figure 6:
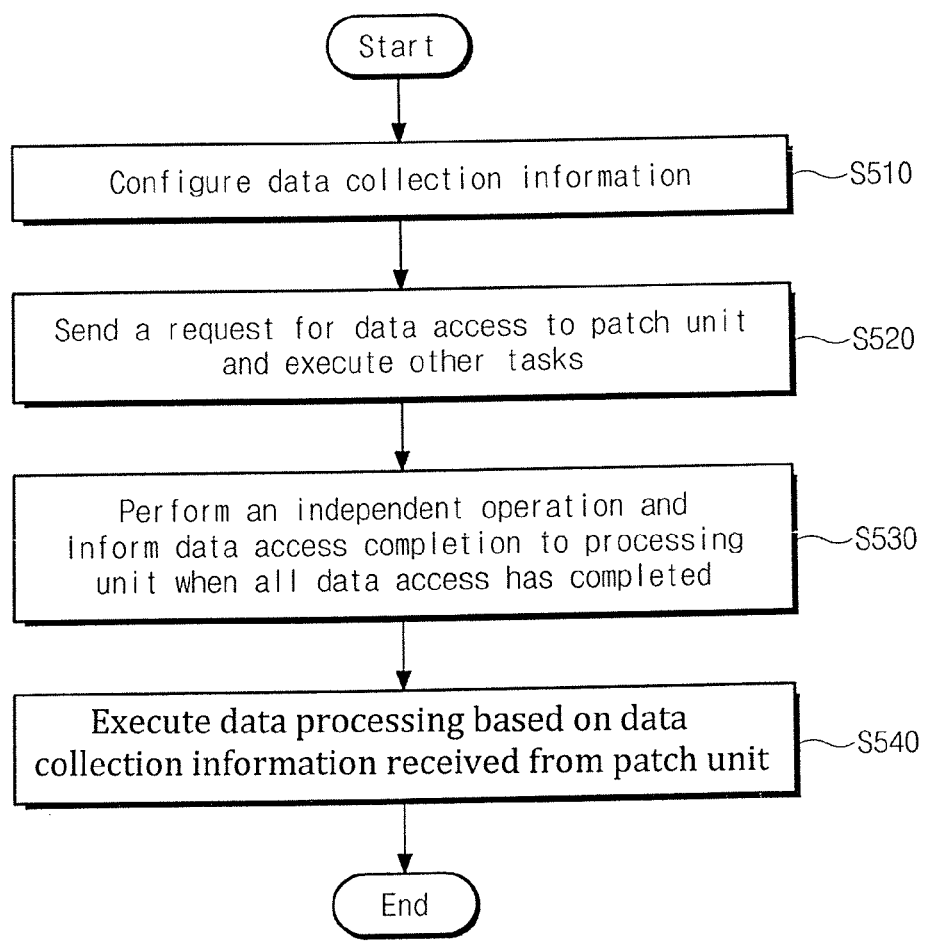
FIG. 6 is a kernel management flow chart according to an exemplary embodiment of the inventive concept in accordance with FIG. 2.

FIG. 6 is a kernel management flow chart according to an exemplary embodiment of the inventive concept in accordance with FIG. 2.

Referring to FIG. 6, in a step S510, the data processing kernel 130 configures data collection information needed for a data processing. A data collection ID and a parameter value needed to calculate an address are configured. A data set is generated which is defined by a high level definition such as a pixel dimension, a pixel format, a pixel coordinate, etc. The data set can be represented by a 3D pixel array.

After the data collection information is configured, the data processing kernel 130 sends a request for data access (e.g., related to a task) to the data patch kernel 110 and the data processing kernel 130 executes other tasks in a step S520. The data processing kernel 130 may send the data collection information to the data patch kernel 110 along with the request. The sending of the request for data access may correspond to the processing unit 131 sending a request REQ to the patch unit 112 in FIG. 5.

After the request REQ has been sent to the data patch kernel 110 by the data processing kernel 130 to request a data access, the data processing kernel 130 can process tasks of other threads or other tasks of a same thread before receiving an acknowledge ACK notifying of an access completion from the data patch kernel 110. That is, after sending the request REQ, the data processing kernel 130 can continuously perform its own process such as an arithmetic operation.

When the data patch kernel 110 receives the request signal REQ, in a step S530, the data patch kernel 110 performs an operation independently from an operation of the data processing kernel 130 and informs the data processing kernel 130 (e.g., the processing unit 131) that access to the requested data has completed. For example, if the operation of the data processing kernel 130 relates to one task, the independent operation could relate to another task or a work item not operated on by the one task.

The data patch kernel 110 performs a high level address calculation and a low level address calculation. The high level address calculation may include calculation of a pixel array index or an offset. That is, a specific position in a high level program can be identified by the high level address calculation.

The low level address calculation may include calculation of a virtual address or a physical address. That is, a final address to access a memory subsystem can be determined by the low level address calculation.

The data patch kernel 110 calculates a high level address and a low level address to access a memory location defined by a data collection and a parameter. The data patch kernel 110 performs a data patch processing beyond the boundary of work items to increase a data reuse rate. This is to maximally guarantee a memory access locality.

If access to all data has completed, the data patch kernel 110 notifies a data access completion to the data processing kernel 130. This may be embodied by providing the acknowledge ACK as shown in FIG. 5.

When receiving the acknowledge ACK, the data processing kernel 130 performs a data processing in the step S540. The data processing is executed based on data collection information received from the data patch kernel 110. The data processing kernel 130 may perform the data processing in a pipe line method to continuously perform a pending arithmetic operation. The data processing may be performed in a variable multi threading. For example, in variable multi threading, the data processing is performed using several software threads, where the number of threads varies based on one or more factors.

Figure 7:
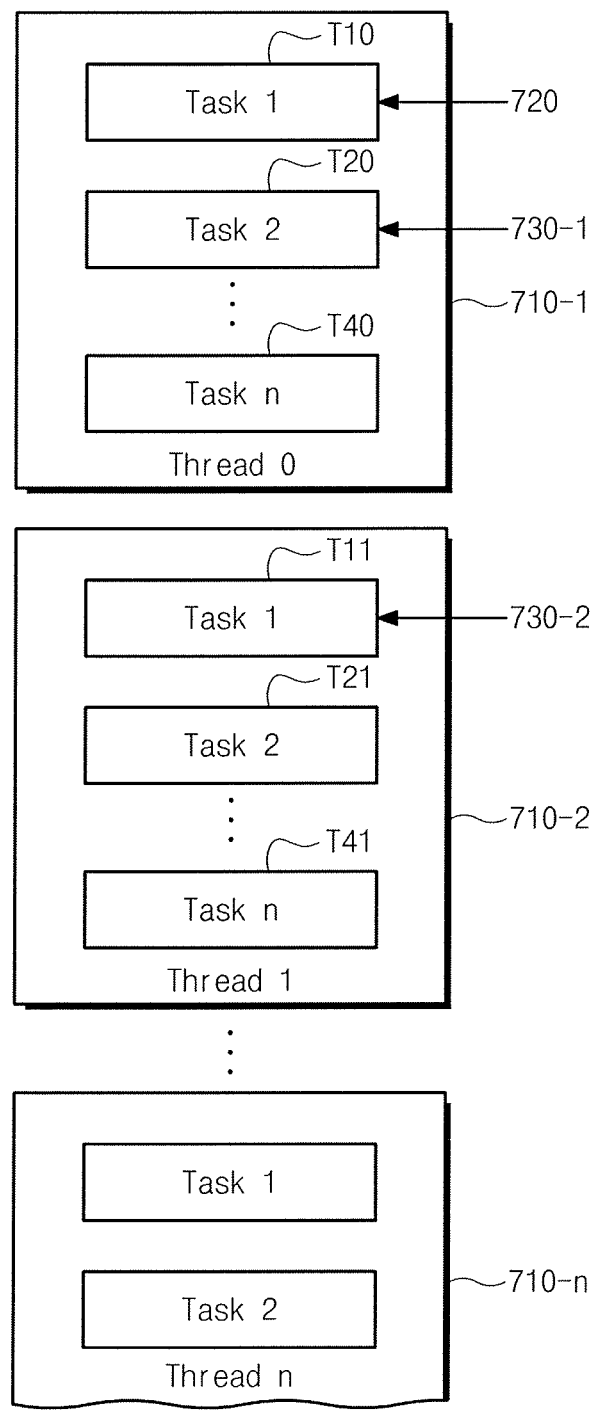
FIG. 7 is a drawing for explaining a threading performance of a data processing kernel in accordance with FIG. 2.

FIG. 7 is a drawing for explaining a threading performance of a data processing kernel in accordance with FIG. 2.

Referring to FIG. 7, a plurality of threads 710-1, 710-2, . . . , 710-n is illustrated which may be executed by the data processing kernel 130. A plurality of tasks may be present in one thread. For example, a task 1 (T10), a task 2 (T20), . . . , a task n (T40) may be present in the thread 710-1. A task 1 (T11), a task 2 (T21), . . . , a task n (T41) may be present in the thread 710-2.

Assume that the data processing kernel 130 performs the task 1 (T10) in the thread 710-1 (reference character 720), and then generates a request REQ. The data processing kernel 130 can perform another task T20 (reference character 730-1) in a same thread or a task T11 (reference character 730-2) in another thread before receiving the acknowledge ACK after generating the request REQ. A communication from a handshaking method can be applied between the data processing kernel 130 and the data patch kernel 110.

FIG. 8 is a drawing illustrating an example of a computer kernel source (e.g., source code) that can be executed by FIG. 4.

A part indicated by a reference character 110a of FIG. 8 represents a computer kernel source of the data patch kernel 110. A part indicated by a reference character 130a represents a computer kernel source of the data processing kernel 130. A part indicated by a reference character 120a represents functions of API to be hardwired.

Figure 9:
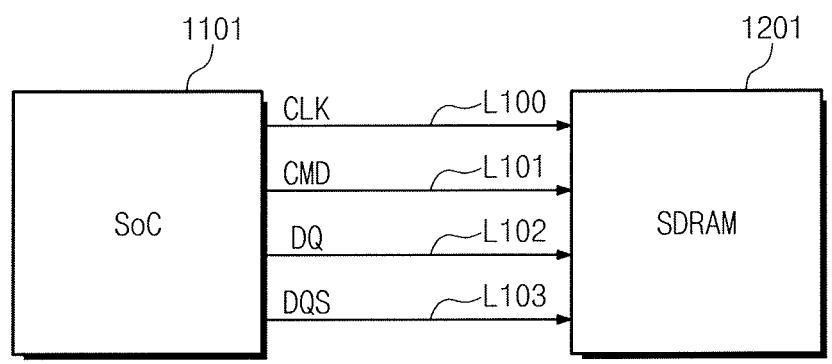
FIG. 9 is a block diagram illustrating an application example of an exemplary embodiment of the inventive concept applied to a SoC.

FIG. 9 is a block diagram illustrating an application example of an embodiment of the inventive concept applied to an SoC.

Referring to FIG. 9, a system may include an SoC 1101 and a SDRAM 1201. The SoC 1101 can perform a function of a GPU such as illustrated in FIG. 4 while performing a function of an SoC.

The SoC 1101 includes an application kernel. The application kernel may include the data patch kernel 110 independently performing a data patch processing beyond the boundary of work items to increase a data reuse rate and the data processing kernel 130 continuously performing an arithmetic operation on the data according to a request from a handshaking method of the data patch kernel 110 when data has all completely been prepared by a data patch processing of the data patch kernel 110 work item by work item.

The SDRAM 1201 connected to the SoC 1101 is a synchronous DRAM and performs a data read operation and a data write operation in synchronization with an external clock. The SDRAM 1201 can function as a memory device for data storage.

The SDRAM 1201 receives an external clock CLK through a line L100. The SDRAM 1201 receives a command CMD being provided from the SoC 1101 through a line L101.

The SDRAM 1201 receives data DQ being provided from the SoC 1101 through a line L102. The SoC 1101 receives read data DQ being provided from the SDRAM 1201 through the line L102.

A data strobe signal DQS may be provided to a line L103 for an input/output timing between the SDRAM 1201 and the SoC 1101.

In FIG. 9, the SoC 1101 divides the application kernel into a data patch kernel (e.g., 110) and a data processing kernel (e.g., 130) and operates them independently from each other. Thus, since performance and efficiency of a data patch unit for a data access and a data processing unit for an arithmetic function are improved, performance of the SoC system may be improved or stabilized.

Figure 10:
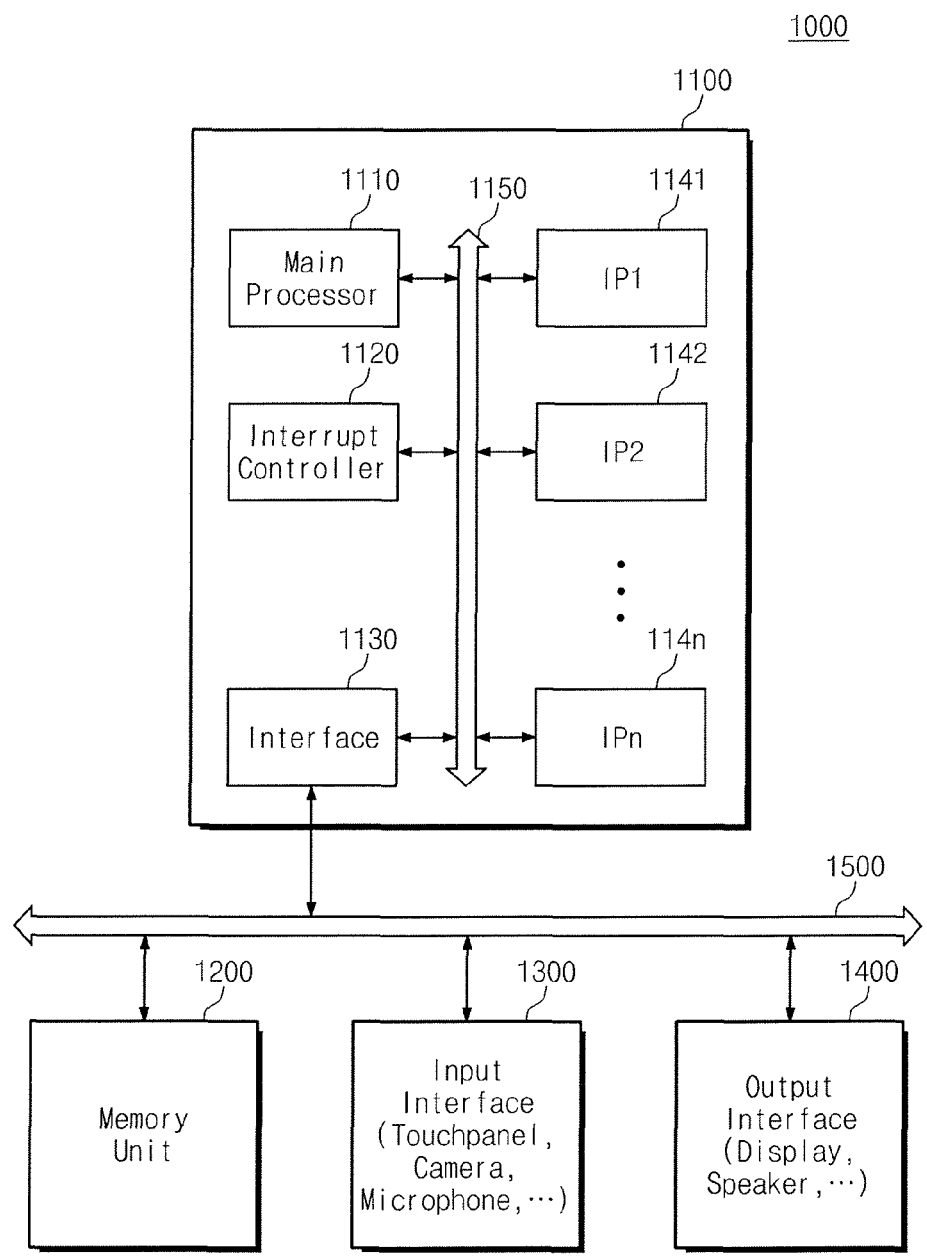
FIG. 10 is a block diagram illustrating an application example of an exemplary embodiment of the inventive concept applied to a multimedia device.

FIG. 10 is a block diagram illustrating an application example of an exemplary embodiment of the inventive concept applied to a multimedia device.

Referring to FIG. 10, a multimedia device 1000 includes an application processor 1100, a memory unit 1200, an input interface 1300, an output interface 1400 and a bus 1500.

The application processor 1100 is configured to control an overall operation of the multimedia device 1000. The application processor 1100 can be formed in a system-on-chip (SoC).

The application processor 1100 includes a main processor 1110, an interrupt controller 1120, an interface 1130, a plurality of intellectual property blocks 1141~414n and an internal bus 1150. An intellectual property block (IP) may also be referred to as an IP core. The IP block may be a reusable unit of logic that is the intellectual property of one party.

The main processor 1110 may be a core of the application processor 1100. The interrupt controller 1120 can manage interrupts that occur within elements of the application processor 1100 and can inform the main processor 1110. For example, the interrupt controller 1120 can inform the main processor 1110 that an interrupt has occurred (e.g., identify the device in which the interrupt occurred, the type of interrupt, etc.).

The interface 1130 can intermediate a communication between the application processor 1100 and external elements. The interface 1130 can intermediate a communication so that the application processor 1100 controls external elements. The interface 1130 may include an interface controlling the memory unit 1200 and an interface controlling the input interface 1300 and the output interface 1400.

The interface 1130 may include a joint test action group (JTAG) interface, a test interface controller (TIC) interface, a memory interface, an integrated drive electronics (IDE) interface, a universal serial bus (USB) interface, a serial peripheral interface (SPI), an audio interface, a video interface, etc.

The intellectual property blocks 1141~114n can be configured to perform specific functions respectively. For example, the intellectual property blocks 1141~114n may include an internal memory, a graphic processing unit (GPU), a modem, a sound controller, a security module, etc.

The internal bus 1150 is configured to provide a channel among internal elements of the application processor 1100. For example, the internal bus 1150 may include an advanced microcontroller bus architecture (AMBA) bus. The internal bus 1150 may include an AMBA high speed bus (AHB) or an AMBA peripheral bus (APB).

The main processor 1100 and the intellectual property blocks 1141~114n may include an internal memory. Image data can be interleaved in the internal memories to be stored.

The image data can be interleaved in the memory unit 1200 that functions as an internal memory and an external memory to be stored.

The memory unit 1200 is configured to communicate with other elements through the bus 1500 of the memory unit 1200.

The input interface 1300 may include various devices receiving a signal from an external device. The input interface 1300 may include a key board, a key pad, a button, a touch panel, a touch screen, a touch pad, a touch ball, a camera including an image sensor, a microphone, a gyroscope sensor, a vibration sensor, a data port for a wired input, an antenna for a wireless input, etc.

The output interface 1400 may include various devices outputting a signal to an external device. The output interface 1400 may include a liquid crystal display (LCD), an organic light emitting diode (OLED) display device, an active crystal display (AMOLED) display device, an LED, a speaker, a motor, a data port for a wired output, an antenna for a wireless output, etc.

The multimedia device 1000 can automatically edit an image being obtained through an image sensor of the input interface 1300 to output an edited result through a display unit of the output interface 1400. The multimedia device 1000 can provide a video conference service which is specialized for a video conference and has an improved service quality (QoS).

The multimedia device 1000 may include a mobile multimedia device such as a smart phone, a smart pad, a digital camera, a digital camcorder, a notebook computer, etc. and a fixed multimedia such as a smart television, a desktop computer, etc.

In FIG. 10, the application processor 1100 may include an application kernel (e.g., 22) including a data patch kernel (e.g., 110) and a data processing kernel (e.g., 130).

Since the data processing kernel continuously performs an arithmetic operation on the data according to a request from a handshaking method of the data patch kernel when data has all completely been prepared by a data patch processing of the data patch kernel work item by work item, performance and efficiency of the application processor 1100 may be improved. Thus, performance of a multimedia device may be improved.

Figure 11:
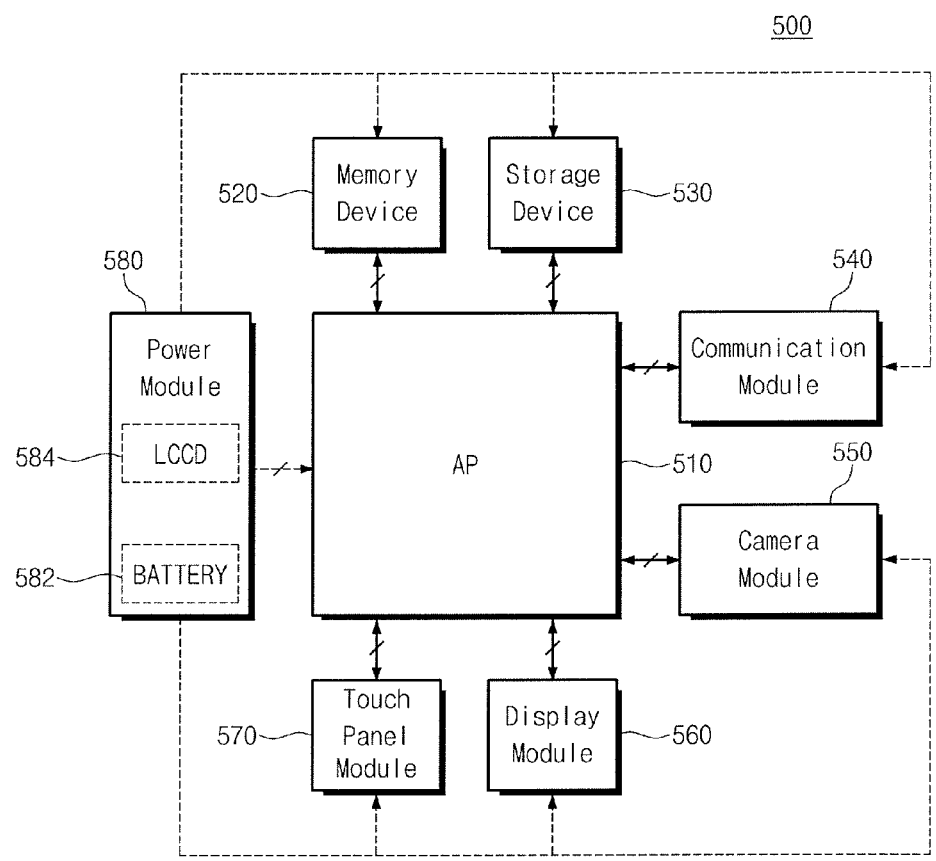
FIG. 11 is a block diagram illustrating an application example of an exemplary embodiment of the inventive concept applied to a mobile device.

FIG. 11 is a block diagram illustrating an application example of an exemplary embodiment of the inventive concept applied to a mobile device.

Referring to FIG. 11, a mobile device 500 that can function as a smart phone may include an AP 510, a memory device 520, a storage device 530, a communication module 540, a camera module 550, a display module 560, a touch panel module 570, and a power module 580.

The AP 510 can perform a data processing function such as illustrated in FIG. 4. Thus, performance of the mobile device may be improved.

The communication module 540 connected to the AP 510 can function as a modem performing a function of a transmission/reception of data or a modulation/demodulation of data.

The storage device 530 can be embodied by a NOR type flash memory or a NAND type flash memory to store large amounts of information.

The display module 560 can be embodied by a liquid crystal having a back light, a liquid crystal having a LED light source or an OLED. The display module 560 functions as an output device displaying an image (e.g., in color, black and white, etc.) such as a character, a number, a picture, etc.

The touch panel module 570 can provide a touch input to the AP 510 alone or on the display module 560.

The mobile device 500 was described mainly as a mobile communication device but in at least one embodiment, the mobile device 500 can function as a smart card by adding or subtracting one or more of the illustrated elements.

The mobile device 500 can be connected to an external communication device through a separate interface. The communication device can be a digital versatile disc (DVD) player, a computer, a set top box (STB), a game machine, a digital camcorder, etc.

The power module 580 performs a power management of the mobile device. In the case that a PMIC scheme is applied to an SoC, power saving of the mobile device is accomplished.

The camera module 550 includes a camera image processor (CIS) and is connected to the AP 510.

Although not illustrated in the drawing, another application chipset or another mobile DRAM may be further provided to the mobile device 500.

Figure 12:
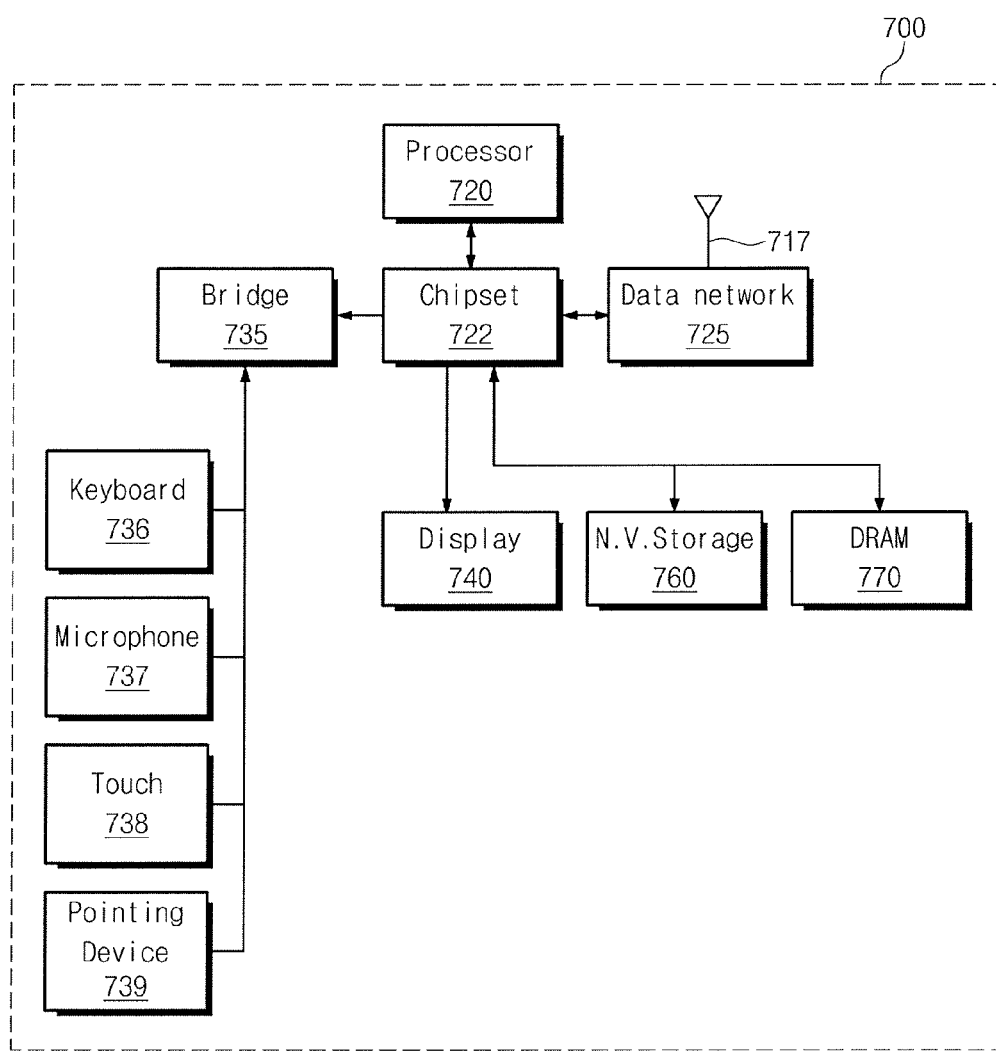
FIG. 12 is a block diagram illustrating an application example of an exemplary embodiment of the inventive concept applied to a computing device.

FIG. 12 is a block diagram illustrating an application example of an exemplary embodiment of the inventive concept applied to a computing device.

Referring to FIG. 12, a computing device 700 includes a processor 720, a chipset 722, a data network 725, a bridge 735, a display 740, a storage 760 (e.g., nonvolatile), a DRAM 770, a keyboard 736, a microphone 737, a touch panel 738 and a pointing device 739.

In FIG. 12, the processor 720 or the chip set 722 may include an application kernel (e.g., 22) including a data patch kernel (e.g., 110) and a data processing kernel (e.g., 130) as shown in FIG. 4.

Since the data processing kernel continuously performs an arithmetic operation on the data according to a request of a handshaking method from the data patch kernel when data has all completely been prepared by a data patch processing of the data patch kernel work item by work item, performance and efficiency of the computing device 700 may be improved.

The chipset 722 can apply a command, an address, data or control signals to the DRAM 770.

The processor 720 functions as a host and controls an overall operation of the computing device 700.

A host interface between the processor 720 and the chipset 722 may include at least one of various protocols to perform a data communication. The chipset 722 can be configured to communicate with a host or an external device through at least one among various interface protocols such as a USB (universal serial bus) protocol, a MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, a SCSI (small computer small interface) protocol, an ESDI (enhanced small disk interface) protocol, and an IDE (integrated drive electronics) protocol.

The nonvolatile storage 760 may be embodied by, for example, an electrically erasable programmable read-only memory (EEPROM), a flash memory, a magnetic random access memory (MRAM), a spin-transfer torque MRAM, a conductive bridging RAM (CBRAM), a ferroelectric RAM (FeRAM), a phase change RAM (PRAM) which is called an ovonic unified memory (OUM), a resistive RAM (RRAM), a nanotube RRAM, a polymer RAM (PoRAM), a nanotube floating gate memory (NFGM), a holographic memory, a molecular electronics memory device, or an insulator resistance change memory.

The computing device of FIG. 12 can be provided as one of various elements of electronic devices such as a computer, an ultra mobile PC (UMPC), a workstation, a net-book, a personal digital assistants (PDA), a portable computer, a web tablet, a tablet computer, a wireless phone, a mobile phone, a smart phone, an e-book, a portable multimedia player (PMP), a portable game machine, a navigation device, a black box, a digital camera, a digital multimedia broadcasting (DMB) player, a three dimensional television, a smart television, a digital audio recorder, a digital audio player, a digital picture recorder, a digital picture player, a digital video recorder, a digital video player, a storage of a data center, a device that can transmit and receive information in a wireless environment, one of various electronic devices of a home network, one of various electronic devices of a computer network, one of various electronic devices of a telematics network, and one of various elements of a radio frequency identification (RFID) device or a computing system.

At least one embodiment of the inventive concept can be embodied as computer-readable codes having computer executable instructions on a computer-readable medium. For example, the operations of FIG. 6 may be embodied as computer executable instructions. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

While the inventive concept has been described with reference to exemplary embodiments thereof, various modifications may be made to these embodiments without departing from the spirit and scope of the present invention.

What is claimed is:

1. A method of processing multimedia data, the method comprising:
separating a defined application kernel into a data patch kernel and a data processing kernel, wherein the defined application kernel is code of an operating system;

requesting, by the data processing kernel, data access to patch data of the multimedia data, from the data patch kernel;

performing, by the data patch kernel, an operation that is independent of the request for preparing data for the data access based on the request; and performing, by the data processing kernel, an arithmetic operation on work items of the prepared data when the data has been prepared by the data patch kernel, wherein the data patch kernel and the data processing kernel are distinct parts of the operating system that communicate with one another using a handshaking method.

2. The method of claim 1, wherein the work items are image pixel data.

3. The method of claim 1, wherein the data patch kernel defines an application program interface to accelerate a processing using hardware support.

4. The method of claim 1, wherein the data processing kernel performs the arithmetic operation using a variable number of threads.

5. The method of claim 1, wherein the data patch kernel prepares the data for the data access by calculating an address on data to be accessed for a data load and a store operation.

6. The method of claim 1, wherein the prepared data is for a task within a thread and the data processing kernel processes other tasks within the same thread before the data has been completely prepared.

7. The method of claim 1, wherein the prepared data is for a task within a thread and the data processing kernel processes tasks of another thread before the data has been completely prepared.

8. The method of claim 1, wherein the data processing kernel performs the requesting as part of the handshaking method by sending a request signal to the data patch kernel.

9. The method of claim 1, wherein the data patch kernel sends an acknowledgement to the data processing kernel as part of the handshaking method when the data patch kernel has completed the preparing of the data.

10. The method of claim 9, wherein the data processing kernel performs the arithmetic operation in response to receipt of the acknowledgement.

11. A method of processing multimedia data, the method comprising:

separating an application kernel operating on the multimedia data into a data patch kernel and a data processing kernel that communicate with one another using a handshaking method;

sending, by the data processing kernel, a request to the data patch kernel for requesting preparation of first data of the multimedia data for a first task;

preparing, by the data patch kernel, the first data in response to the request and second data independent of the request for a second task;

processing, by the data processing kernel, the second data of the second task before receiving an acknowledge from the data patch kernel indicating that access to the first data has completed; and continuously performing, by the data processing kernel, an arithmetic operation on work Items of the prepared first data when preparation of the first data has completed.

12. The method of claim 11, wherein the work items are red, green, blue R, G, B pixel data.

13. The method of claim 11, wherein the data patch kernel prepares the first data by calculating a high level address and a low level address on data to be accessed for a data load and a store operation.

14. The method of claim 11, wherein the work items are for the first task of a first thread, and a second thread includes the second task.

15. The method of claim 11, wherein the work items are for the first task of a thread, and the same thread includes the second task.

16. The method of claim 11, wherein the data patch kernel is programmed to support hardwired logic needed for a data patch.

17. The method of claim 16, wherein the data patch kernel programs a new instruction set architecture for the data patch.

18. The method of claim 16, wherein the data processing kernel performs the arithmetic operation using a dynamically changing number of threads.

19. The method of claim 11, wherein the application kernel is code of an operating system, and wherein the data patch kernel and the data processing kernel are distinct parts of the operating system.

20. The method of claim 11, wherein the data processing kernel performs the arithmetic operation in response to an acknowledgement received from the data patch kernel indicating the preparation of the first data has completed.

* * * * *